Aug. 26, 1952  F. H. SMITH  2,608,060
HYDRAULIC STEERING SYSTEM
Filed May 9, 1949  2 SHEETS—SHEET 1
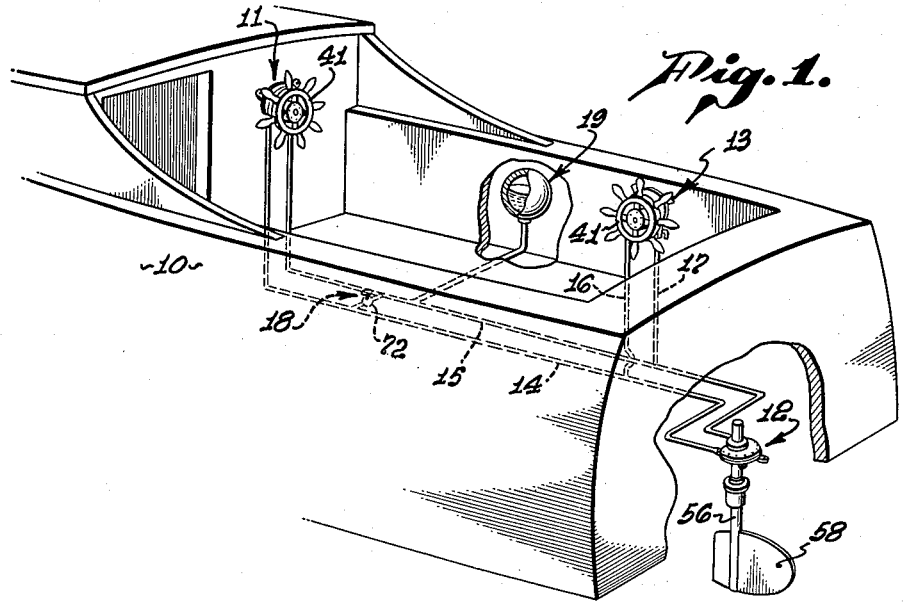
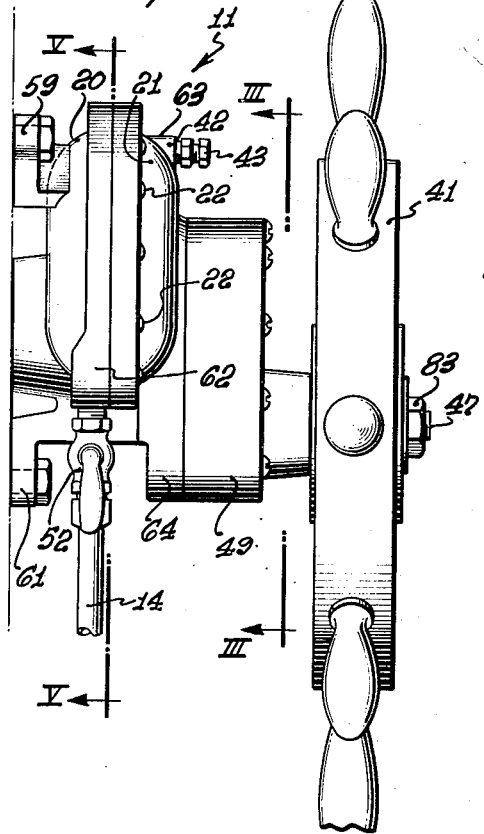
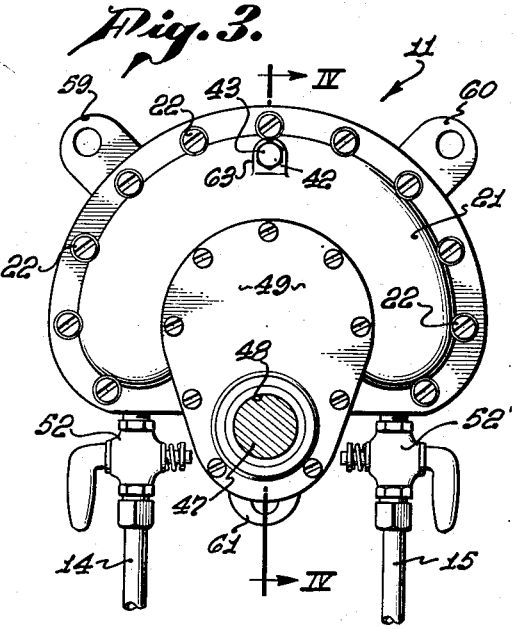
INVENTOR.
FRANK H. SMITH,
BY
ATTORNEY.

Aug. 26, 1952          F. H. SMITH          2,608,060
HYDRAULIC STEERING SYSTEM
Filed May 9, 1949          2 SHEETS—SHEET 2
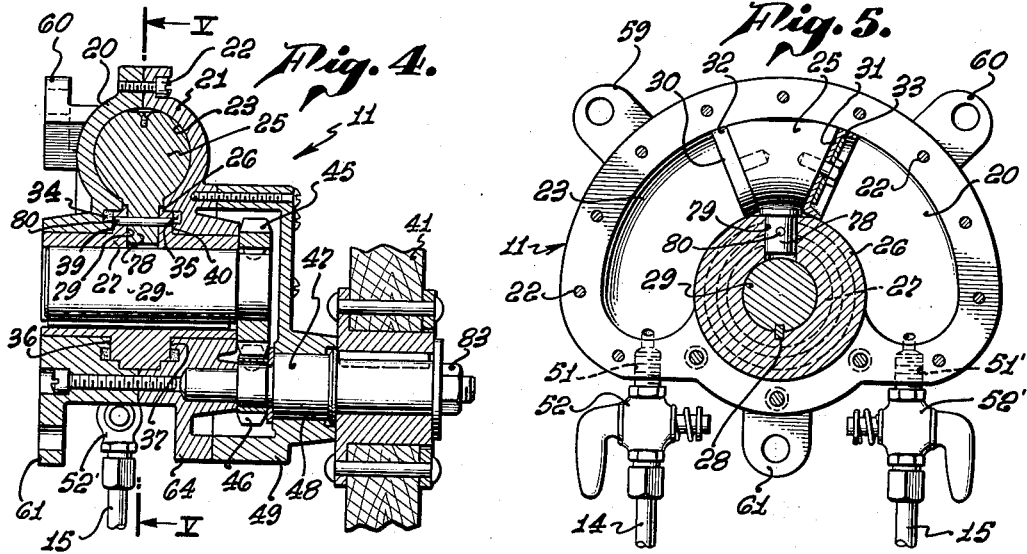
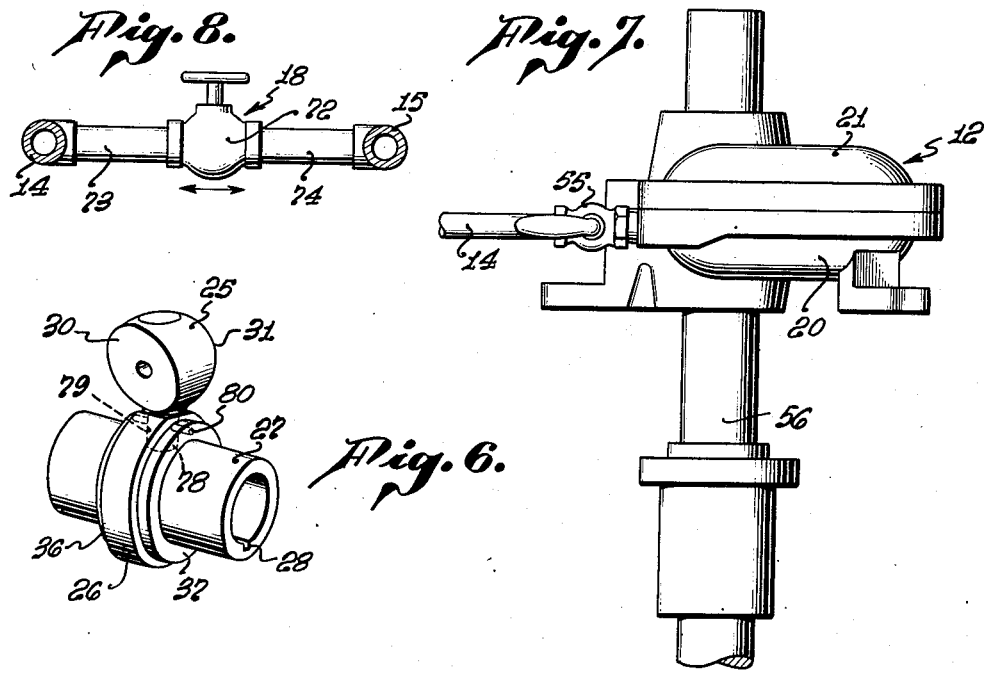
INVENTOR.
FRANK H. SMITH,
BY
ATTORNEY.

Patented Aug. 26, 1952

2,608,060

UNITED STATES PATENT OFFICE 2,608,060

HYDRAULIC STEERING SYSTEM

Frank Harold Smith, Los Angeles, Calif., assignor of one-half to James H. Mitchell, Los Angeles, Calif.

Application May 9, 1949, Serial No. 92,187

3 Claims. (Cl. 60—54.5)

This invention relates to a hydraulic motion-transmitting system and more particularly relates to such a system adapted for use in steering a vessel.

Hydraulic systems have been used in the past for transmitting motion, including rotational motion, for steering vessels. However, the cost of such a system and its bulk have heretofore made it impracticable to be incorporated into the design of small boats and thus to take advantage of the flexibility and reliability afforded by the use of hydraulic steering control. It is therefore an object of the present invention to disclose a simple and economical hydraulic system for the transmission of rotational motion.

Another object of the invention is to disclose such a system whose driving unit and driven unit are made of substantially identical component parts, thus promoting economy of manufacture.

A further object is to disclose a hydraulic steering control system including means for setting the rudder to cause the vessel to continuously describe a circle of selected radius.

A still further object is to disclose a hydraulic steering control system including means for adjusting the calibration of wheel and rudder.

These and other purposes will be clear from the following description taken in connection with the accompanying drawings in which:

Fig. 1 is a perspective view of my control system mounted in a vessel, part of the stern being broken away.

Fig. 2 is a side elevational view of a driving unit.

Fig. 3 is a front elevational view of a driving unit taken on line III—III of Fig. 2.

Fig. 4 is a sectional view of a driving unit taken on line IV—IV of Fig. 3.

Fig. 5 is an elevational view partly in section taken on lines V—V of Figs. 2 and 4.

Fig. 6 is a perspective view of the hollow sleeve carrying the piston thereon.

Fig. 7 is a side elevational view of the driven unit including the rudder shaft.

Fig. 8 shows the valve and conduits constituting the cross-connection bleeder means.

In general, my invention comprises one or more driving units, a driven unit, conduits connecting the several units, and may include bell chamber means for maintaining pressure in the system and cross-connection bleeder means for permitting convenient periodic calibration of wheel and rudder.

Referring in detail to Fig. 1, the vessel 10 is equipped with a driving unit 11 and a driven unit 12. One or more auxiliary driving units as at 13 may be connected into the conduits 14 and 15 by connecting conduits 16 and 17. Also, in the conduit system I may provide cross-connection bleeder means as at 18 and bell chamber accumulator means 19, the functions of which latter two means will be described in detail hereinafter.

Fig. 2 illustrates a preferred design of a driving unit and wheel. Driving unit 11 includes two arcuate members 20 and 21 held together as by cap screws 22 and so arranged as to form an arcuate cylinder 23 substantially circular in cross-section as seen most clearly in Fig. 4.

Piston 25 as shown in Fig. 6 is mounted on annular raised portion 26 of hollow sleeve 27, the sleeve in turn being fixed as by a key engaging keyway 28 to driving shaft 29. The piston is arranged for sliding movement within cylinder 23, such movement being translated into rotational movement of shaft 29. Two faces 30 and 31 are provided on piston 25 and each face is equipped with gasket means 32 and 33 to provide a seal during the movement of piston 25 within cylinder 23. Additional gasket means are provided at 34 and 35 for sealing the sliding engagement between faces 36 and 37 of sleeve 27 and the associated surfaces 39 and 40 of arcuate members 20 and 21. Pipe tap connection 42 is provided for filling the entire system with liquid and is normally closed by pipe plug 43.

In order to provide greater convenience in steering I prefer to use a pair of reduction gears between wheel 41 and shaft 29. The larger of such gears 45 is mounted on shaft 29 and is keyed thereto and meshes with gear 46 which is keyed to countershaft 47; on the other end of countershaft 47 is mounted wheel 41. Countershaft 47 is supported by bearing surface 48 of the gear housing 49 and wheel 41 may be made demountable from countershaft 47 as by means of nut 63 threaded on the end of countershaft 47.

One arcuate member 20 forming cylinder 23 is provided with ports 51 and 51' at the ends of the arc, communicating with petcocks 52 and 52' which control the flow of liquid into or out of conduits 14 and 15. Thus when more than one driving unit is provided in the system, the petcocks associated with the driving units not used may be closed in order to isolate such non-used units from the system.

In Fig. 7 it may be seen that a similar petcock 55 is provided at the point where each conduit enters driven unit 12. Said driven unit 12 is identical with driving unit 11 except that preferably no gearing is used in the driven unit, shaft 56 being extended to directly control rudder 58.

It should be noted that arcuate members 20 and 21 differ from each other only in minor details. Ears 59, 60 and 61 and port boss 62 are formed integrally with arcuate member 20 when said member is cast. Filler hole boss 63 and gear box boss 64 are similarly formed integrally with arcuate member 21. Said ears and bosses are formed in casting by elements attachable to the basic arcuate pattern forming arcuate members 20 and 21.

Thus it can be seen that I have provided a compact hydraulic control system wherein the driven unit is substantially identical with the driving unit and the arcuate cylindrical housing of each unit is constructed of substantially identical arcuate members.

In order to compensate for loss of fluid occurring over a long period and to maintain pressure in the system despite such loss I may provide a bell chamber as at 19. Said chamber maintains pressure in the system by the presence of air captured in the upper part thereof.

If, after considerable use of my device, the system becomes unbalanced so that the neutral or center position of the piston in a driving unit no longer corresponds to the neutral or center position of the piston in a driven unit, it may be necessary to calibrate the positions of the two pistons. In order to accomplish this I may provide cross-connection balancing or bleeder means 18, shown in detail in Fig. 8, including valve 72 and conduit lines 73 and 74 connecting with conduit lines 14 and 15. Valve 72 is normally closed but when it is desired to recalibrate the system the pistons of all driving units are placed in their central position, valve 72 is opened and rudder 58 is then adjusted to its central position. Valve 72 is then closed and the system is thus restored to balance for continued operation.

The construction of the piston assembly will be understood by reference to Fig. 6. It can be seen that piston 25 is a section of a torus and includes a downwardly projecting arm 78 which is received in hole 79 radially disposed in annular raised portion 26 of hollow sleeve 27. Said arm is fixed in said hole by removable pin 80, whose axis is parallel to the axis of hollow sleeve 27.

Thus I have disclosed a simple, easily manufactured hydraulic control system for a vessel, doing away with all disadvantages associated with the use of ropes, such as rotting, fraying, and the necessity of providing pulleys. It should be noted that additional wheels may be provided in my system anywhere on the vessel, and any wheel or wheels may be disassociated from the system by means of the petcocks provided with each driving unit.

In fishing from a vessel, it is often desirable to circle a school of fish for some time, and without continuous attention to the wheel. This result is accomplished with ease by my system, since it is only necessary, after adjusting the wheel to the desired setting, to close one or both petcocks associated with the wheel being used. The vessel will then continue to circle without further manipulation of the wheel.

If it is desired to remove the gears in a driving unit for repair, or to substitute a different pair of gears, such removal may be easily accomplished without disturbing the hydraulic system. Gear housing 49 is secured to arcuate member 21 by capscrews facilitating removal of said gear housing when desired. It is to be understood that instead of the simple gearing illustrated, planetary gearing between the wheel shaft 47 and the piston shaft 29 may be used. When such planetary gearing is employed, the end of the wheel shaft 47 may extend into and be journaled in the end of the piston shaft 29, such piston shaft being provided with a suitable internal gear, whereas the wheel shaft carries a pinion, planetary gears being interposed between said pinion and internal ring gear.

Other minor changes in construction coming within the scope of the appended claims will occur to those skilled in the art. For example, although cup gaskets 30 have been illustrated, the movable member 25 may be provided with O-rings. The method of holding the piston on its sleeve 26 may be varied and the arm 78 instead of being integral with the piston may, of course, be placed into the sleeve and extend into a recess of the piston for attachment thereto.

Although I have shown an embodiment of my invention wherein the alowable movement of the piston is substantially 180 degrees of arc, it is understood that such movement may be smaller or larger than that amount without departing from the spirit of my invention.

It is understood that the description and figures herewith are exemplary only and that the invention is to be interpreted in the light of the appended claims.

I claim:

1. In a hydraulic motion-transmitting system including at least one driving unit and a driven unit inter-connected by conduits containing a virtually noncompressible fluid, the combination of: a single arcuate cylinder in each unit comprising two opposed arcuate members, said cylinder being circular in cross-section; a shaft rotatably mounted in each unit concentric with the arc formed by said cylinder; a hollow sleeve surrounding and concentric with said shaft and rigidly fixed thereto; a radially projecting arm on said sleeve; a circular piston secured to the outer end of said arm and arranged for sliding movement within said cylinder; gasket means for sealing the sliding engagement between piston and cylinder and between said arm and cylinder; and conduit means for inter-connecting said units to transmit movement of the piston of a driving unit to the piston of the driven unit, said conduit means including bell chamber means for maintaining pressure in the system.

2. A hydraulic system in accordance with claim 1 wherein said conduit means include cross-connection bleeder means to permit adjusting the position of the piston of one unit without affecting the positions of other pistons in the system.

3. In a hydraulic steering system a driving unit comprising an arcuate cylinder, a shaft rotatably mounted concentric with the arc formed by the cylinder, a piston slidably engaging the cylinder and arranged to rotate with said shaft, and gasket means sealing the sliding contact between said piston and cylinder; a driven unit identical with said driving unit; and conduit means containing non-compressible fluid inter-connecting said driving and driven units, said conduit means including cross-connection bleeder means for periodic recalibration of driving and driven units.

FRANK HAROLD SMITH.

REFERENCES CITED

The following references are of record in the file of this patent:

UNITED STATES PATENTS

| Number | Name | Date |
|---|---|---|
| 625,352 | Paidassy | May 23, 1899 |
| 976,907 | Pagendarm | Nov. 29, 1910 |
| 986,065 | Janney | Mar. 7, 1911 |